United States Patent [19]

Dillon

[11] 4,243,734
[45] Jan. 6, 1981

[54] MICRO-DOT IDENTIFICATION

[76] Inventor: George A. Dillon, 1120 E. Beutiful La., Phoenix, Ariz. 85040

[21] Appl. No.: 923,074

[22] Filed: Jul. 10, 1978

[51] Int. Cl.$^3$ .......................... G03C 5/08; G03C 5/00
[52] U.S. Cl. ............................................ 430/8; 427/7
[58] Field of Search ..................... 96/46; 427/7; 430/8

[56] References Cited

U.S. PATENT DOCUMENTS

| 3,272,533 | 9/1966 | Allen | 427/7 X |
|---|---|---|---|
| 3,470,120 | 9/1969 | Sasai | 427/421 X |
| 3,698,645 | 10/1972 | Coffey | 239/579 X |
| 3,772,200 | 11/1973 | Livesay | 250/303 X |
| 3,861,886 | 1/1975 | Meloy | 23/230 R X |
| 3,897,284 | 7/1975 | Livesay | 252/408 X |
| 4,053,433 | 10/1977 | Lee | 428/407 X |
| 4,066,280 | 1/1978 | Lacapria | 427/7 X |

Primary Examiner—James R. Hoffman
Attorney, Agent, or Firm—Don J. Flickinger

[57] ABSTRACT

Micro-dots carrying indicia identifying the owner of an article and the method of preparing and using such micro-dots. The micro-dots are small pieces of foil of any of several shapes with square being the preferred shape, and having an area defined by sides having an extent in the nature of 0.007 inch. Printed on the area of each dot is indicia identifying a particular owner. The method consists essentially of printing the indicia in multiple units on a large plate with the images being reduced in size by step photographing process, which results in a glass slide having the negatives of the images developed thereon. These images are transferred photographically to a piece of film of the same size which is cut into the individual dots. It is then immersed in a fluid, such as a clear resin, and applied to an article that is to be protected. The article or any part thereof with the micro-dots thereon is retrieved and examined by a microscope to identify the owner.

10 Claims, 6 Drawing Figures

U.S. Patent  Jan. 6, 1981  4,243,734
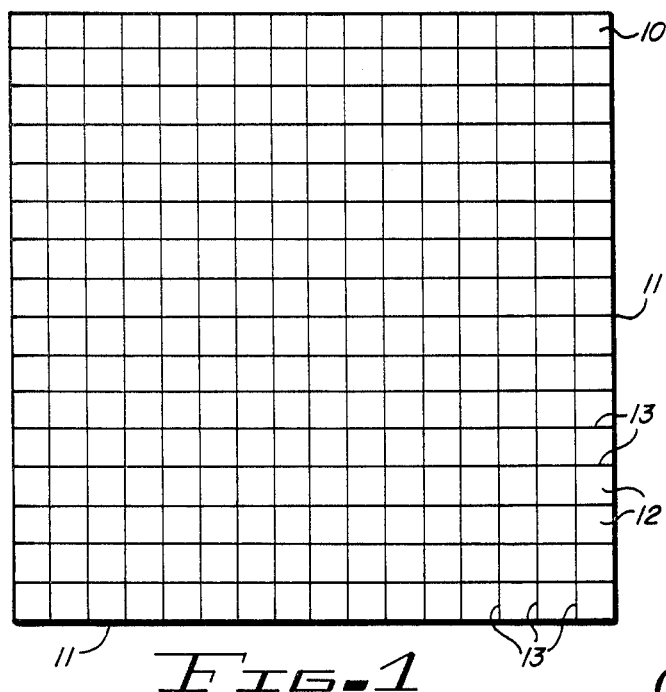
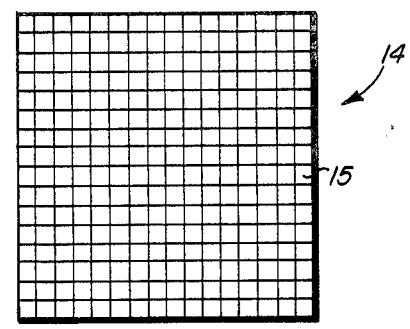
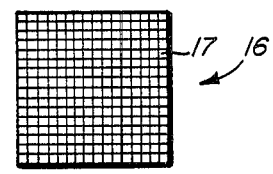
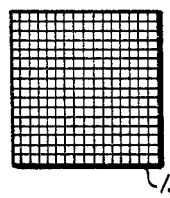
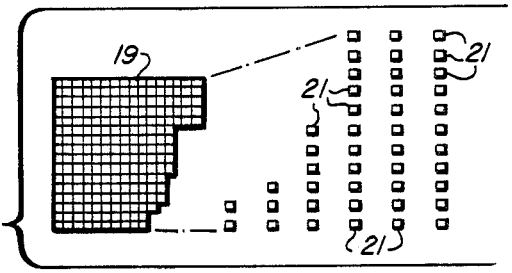
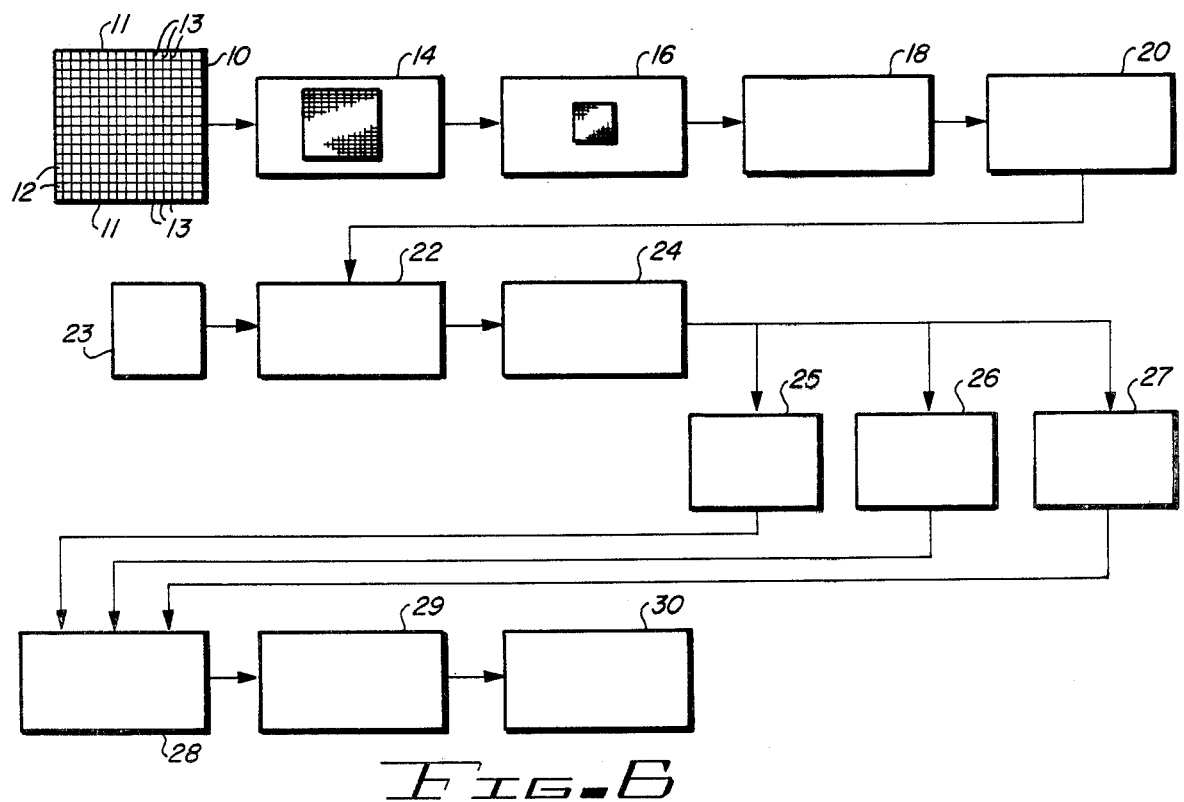

MICRO-DOT IDENTIFICATION

The present invention relates to the protection of articles through the identification thereof by micro-dots displaying indicia which identifies the owner, together with the method of preparing such micro-dots and using them for identification purposes.

BACKGROUND OF THE INVENTION

At the present time just about every community in the nation is suffering from a crime wave and particularly from the theft of various articles which may range in size over a wide span. The present invention is founded on the belief that if means are provided for identifying the owners of particular articles without the person appropriating the article knowing that it is being so protected, and which identification can be easily discerned, these crimes of theft will be reduced appreciably.

Before this application was prepared for filing in the United States Patent and Trademark Office, a patentability search was conducted to bring to light prior art patents which come closest to the present subject. These patents are cited below and the Applicant states that they constitute the prior art of which he is aware that come closest to the subject micro-dots and method of producing and using them:

| | | | |
|---|---|---|---|
| 3,272,533 | Allen | 3,772,200 | Livesay |
| 3,698,645 | Coffey | 3,897,284 | Livesay |
| 4,066,280 | La Capria | 3,861,886 | Meloy |
| 4,053,433 | Lee | 3,470,120 | Sasai |

Of the above-cited patents, that to Lee is believed to come closest to the present subject. In accordance with this patent individual units of production, such as articles or bulk substances, have micro-particles intimately associated therewith. These micro-particles are color-coded with a particular code being used to identify a particular owner. There are, of course, a large number of codes which may be derived from 34 different colors. In fact, the number is so great that it becomes an absolute necessity to refer to a master code in order to identify the owner of a particular set of coded micro-particles. The necessity of using such a master code has resulted in great resistance by the public to the acceptance and use of such a method of identifying articles and bulk materials.

OBJECTS OF THE INVENTION

With the foregoing conditions in mind, the present invention has in view the following objectives:

1. To provide a micro-dot which displayes indicia identifying a particular owner and which is adapted to be applied to articles or bulk material;
2. To provide micro-dots of the character aforesaid having an area which ranges from one equivalent in size to a square having sides 0.003 inch in lengh to one having a size equivalent to a square having sides of 0.125 inch in length;
3. To provide micro-dots of the character aforesaid of a size equivalent to a square having side edges of 0.007 inch;
4. To provide micro-dots of the kind described which are polygonal in shape;
5. To provide micro-dots of the type noted which are of square shape;
6. To provide a method of preparing and using micro-dots for owner identification purposes which includes the steps of printing a plurality of images of indicia identifying a particular owner on a glass plate, reducing the images in size by a step photographic process which terminates with negatives of the images being developed on a glass slide, transferring the images from the glass slide to a film which will accept photographic emulsions, by conventional contact printing processes, for example, cutting the film into individual micro-dots, immersing the dots in a fluid, then applying the fluid with the dots suspended therein to the article or bulk material to be protected, and drying the fluid to leave the micro-dots in close association with the article or bulk material;
7. To provide a method of the type noted, together with the steps of retrieving a portion of the article or bulk material with the micro-dots associated therewith and examining the micro-dots under a high-powered lens such as a microscope to identify the owner;
8. To provide, in a method of the character aforesaid, the step of suspending the micro-dots in a clear resin;
9. To provide, in a method of the character aforesaid, the step of cutting the film into the micro-dots by a stylus or a laser beam; and
10. To provide, in a method of the kind described, the step of applying the fluid with the micro-dots suspended therein to the article or bulk material being protected by a brush, aerosol spray or sprinkling device.

Various other more detailed objects and advantages of the invention such as arise in connection with carrying out the above-noted ideas in a practical embodiment will in part become apparent and in part be hereinafter stated as the description of the invention proceeds.

SUMMARY OF THE INVENTION

The foregoing objects are achieved by first printing a plurality of images of indicia on a plate and reducing said images in size by step-photographic process which terminates with negatives of the images being impressed, or developed, on a glass slide. The images are then transferred photographically by a contact printing process, for example, to a piece of film of the same size and shape as the glass slide and which will accept a photographic emulsion. This film is then cut into the micro-dots, each of which displays indicia identifying a particular owner of goods to which the micro-dots are to be applied.

In a preferred form of the invention, the micro-dots are square in shape and have an area in the order of 0.007 inch square. The film from which the miro-dots are made is of a suitable plastic such as Mylar. The micro-dots are then immersed in a fluid of which a clear resin is a good example. The density of the micro-dots in the fluid will depend largely on the particular article or material to be protected and the area available for the application of the micro-dots thereto. The micro-dots may be applied either by a brush, mop, swab or similar device; an aerosol spray or other gas-propelled spraying device; or a sprinkler. After the micro-dots are applied to the article or bulk material, it is permitted to dry, leaving a large number of the micro-dots in close association with areas of the articles or materials and in many instances will adhere thereto.

When the article or bulk material comes under the control of a police officer or anyone suspecting that a theft has been committed, a part of the article or a portion of the bulk material is retrieved and inspected under a high-powered lens such as a microscope. Such inspection readily identifies the owner of the article or material and without reference to a master code or other complicated device or system.

For a full and more complete understanding of the invention, reference may be had to the following description and accompanying drawing, wherein:

FIG. 1 is a plan view somewhat diagrammatic of a plate on which a plurality of the images are printed and which plate also may be inscribed with lines which define the shape of a particular micro-dot;

FIG. 2 is a view similar to FIG. 1 in which the images have been reduced in size and transferred to a smaller plate by step-photoreduction process;

FIG. 3 is a plan view similar to FIGS. 1 and 2 of a glass slide having negatives of indicia of ownership impressed thereon;

FIG. 4 is a plan view of a piece of film which will accept a photographic emulsion and which has the plurality of images impressed thereon;

FIG. 5 is a diagrammatic view illustrating how the piece of film of FIG. 4 is cut into a small number of micro-dots; and FIG. 6 is a flow chart depicting the process of preparing and using the micro-dots.

DESCRIPTION OF A PREFERRED EMBODIMENT

Referring now to the drawing, wherein like reference characters denote corresponding symbols, and first more particularly to FIG. 6, a plate is therein illustrated and identified by the reference character 10. While the plate 10 may be of any size or shape found to be desirable under a particular set of circumstances, in the illustrated embodiment it is square, having four side edges 11. The exposed face of this plate 10 is divided into individual sections, each of which is designated 12, and each of these sections 12 displays indicia represented at 13 which identifies a particular person, party or entity who might be the owner of a particular article or bulk material. Without here setting forth dimensions for the plate 10 because they are not critical, it is noted that in the block designated 14, the sections 12 are reduced in size by three-fourths, as represented by the plate shown at 15 in FIG. 2. The indicia 13 will also have a corresponding reduction in size.

This reduction in size of the sections which display the indicia is continued step by step in a photographic process which terminates at the block represented at 16 in FIGS. 6 and 3. In the step represented at 16, a glass slide 17 has photographic negatives of the indicia 13 developed thereon.

At the step represented by the block 18, as shown in FIGS. 6 and 4, a piece of film 19 which will accept a photographic emulsion such as Mylar a photograhic film, that has printed on it, by being exposed and developed, reproductions of the indicia 13 in each section 12 as they were developed, or photographically formed, on slide 17. Film piece 19, after being developed, or when the printing process is completed, is divided into sections similar to sections 12 of block 10 of FIG. 6, but with the reproductions of indicia 13 being greatly reduced. These sections of the film piece 19 become micro-dots provided by the finished process. These micro-dot sections of strip 19 are cut into the micro-dots in the step represented at 20 in FIG. 6 and depicted somewhat diagrammatically in FIG. 5. Thus, the sections shown at 21 in FIG. 5 may be formed by cutting the Mylar film 19 by stylus or laser beam to separate the several sections.

After being so separated, the dots 21 are immersed in a fluid such as a clear resin at the step represented by block 22. The introduction of the clear resin is indicated by block 23. The clear resin with the micro-dots 21 suspended therein with a degree of concentration related to the article or bulk material to be protected is applied to the articles or material as represented by the major block 24 and subblocks 25, 26 and 27. The article or bulk material to be protected is represented by block 28 and the micro-dots are applied thereto either by a brush, mop, swab, or similar device, indicated by the subblock 25; spraying as by an aerosol spraying device, as represented by the block 26; or by sprinkling, as represented by the block 27. After the micro-dots have been applied to the article or material being protected, the fluid carrier is permitted to dry, as represented by the block 29. Such a drying period will of course depend on the nature of the particular fluid carrier used, its viscosity, and the degree of suspension of the micro-dots 21 therein.

Should the particular article or portion of the bulk material to which the micro-dots have been applied be purloined and come under the control of a law enforcement officer or one having the authority to inspect the article or material to determine its ownership, it is inspected by a high-powered lens such as a microscope, indicated at 30. Thus, the owner is directly identified without reference to a master code or the use of any similar device or system which would require such manipulation activity as to discourage the use of the micro-dots by the public.

It is important to note that the sections 12 are shown as square. It would be highly practical that they be of other polygonal shape such as triangles or hexagons which would permit of lines defining their shape being readily inscribed on the plate 10. It is also possible that they be circular or oval in shape, but such formations would involve a waste of material.

It is also notable that the film 19 could be of any material presenting a slick surface, such as a plastic or a metal foil such as aluminum or copper foil. It is further noted that the square section 12 might range in size from one having side edges 0.003 inch in length to one having side edges of 0.125 inch in length, but 0.007 inch is the preferred size for the micro-dots.

The carrier fluid which is introduced from block 13 into the chamber represented by block 22 may be a gas or liquid suitable to having pressure applied thereto which facilitates application of the micro-dots to the articles or bulk material. Moreover, it is noted that the indicia which is displayed on each micro-dot might be the initials of the owner, his social security number, license number of his automobile or, in the event of a business organization, a trademark or other symbol that is used to identify such an organization.

While a preferred specific embodiment of the invention is hereinbefore set forth, it is to be clearly understood that the invention is not to be limited to the exact shapes, materials and steps illustrated and described because various modifications of these details may be provided in putting the invention into practice.

What is claimed is:

1. In the production and use of micro-dots for owner identification purposes, the method comprising the steps of:
   - (a) printing a plurality of indicia identifying a particular owner on a plate;
   - (b) reducing images of said indicia by step-reduction photographic process, terminating with negatives of the images of indicia on a glass slide;
   - (c) printing said images produced in step (b) on a strip of photographic film;
   - (d) cutting said strip into individual micro-dots;
   - (e) immersing said micro-dots in a carrier fluid; and
   - (f) applying said fluid with the micro-dots suspended therein to goods to be protected.

2. The method of claim 1 together with the step of retrieving a portion of the goods to which the micro-dots have been applied and inspecting them through a microscope.

3. The method of claim 1 in which each image of said indicia is displayed on a square section of the strip, resulting in micro-dots of square shape.

4. The method of claim 1 in which each image of said indicia is displayed on a polygonal section of the strip, resulting in micro-dots of polygonal shape.

5. The method of claim 1 in which said carrier fluid is a clear resin.

6. The method of claim 1 in which the carrier fluid with the dots suspended therein is applied to the goods to be protected by a brush-like instrument.

7. The method of claim 1 in which the carrier fluid with the micro-dots suspended therein is applied to the goods to be protected by an aerosol spray.

8. The method of claim 1 in which the carrier fluid with the micro-dots suspended therein is applied by a sprinkling device.

9. The method of claim 1 in which the flexible strip is divided into the micro-dots by cutting with a stylus.

10. The method of claim 1 in which the flexible strip is divided into the micro-dots by cutting with a laser beam.

* * * * *